United States Patent [19]
Zaretsky

[11] Patent Number: 5,786,974
[45] Date of Patent: Jul. 28, 1998

[54] APPARATUS FOR AND METHOD OF SUPPRESSING POWER SURGES UTILIZING ELECTRICAL STRIPLINES

[75] Inventor: Albert Zaretsky, Brooklyn, N.Y.

[73] Assignee: Leviton Manufacturing Co., Inc., Little Neck, N.Y.

[21] Appl. No.: 815,759

[22] Filed: Mar. 12, 1997

Related U.S. Application Data

[63] Continuation of Ser. No. 514,202, Aug. 11, 1995, abandoned.

[51] Int. Cl.$^6$ .................................................. H02H 7/00
[52] U.S. Cl. ........................................ 361/107; 361/111
[58] Field of Search ............................ 361/107, 110, 361/111, 113, 118, 119, 56; 333/128, 12, 204, 81 A, 238, 246, 247, 254, 260

[56] References Cited

U.S. PATENT DOCUMENTS

| | | | |
|---|---|---|---|
| 4,262,265 | 4/1981 | Nygren et al. | 333/33 |
| 4,542,358 | 9/1985 | Boby | 333/12 |
| 4,720,690 | 1/1988 | Popek et al. | 333/1 |
| 5,384,429 | 1/1995 | Bulson et al. | 361/113 |

*Primary Examiner*—Ronald W. Leja
*Attorney, Agent, or Firm*—Paul J. Sutton

[57] ABSTRACT

A method and apparatus for suppressing surges in an electrical power distribution system utilizing stripline techniques. The apparatus includes an input terminal which connects a phase electrical power source to a TVSS device. A stripline circuit connects the input terminal to the TVSS device to greatly reduce the inductance of the connection. Consequently, the clamping voltage rating of the TVSS device is substantially maintained at the input terminal during the occurrence of a power surge.

18 Claims, 2 Drawing Sheets

APPARATUS FOR AND METHOD OF SUPPRESSING POWER SURGES UTILIZING ELECTRICAL STRIPLINES

This is a continuation of application Ser. No. 08/514,202 filed on Aug. 11, 1995, now abandoned.

BACKGROUND OF THE INVENTION

Today, it is well known that surges in electrical power may appear, from time to time, in electric utility power distribution systems and within residential, commercial and industrial electrical power systems. An electrical power surge potentially could have a current magnitude as high as a few thousand amperes and a time duration as short as a few microseconds. Electrical power surges potentially contain sufficient energy to destroy unprotected or poorly protected equipment connected to the electrical system.

In order to protect connected electrical equipment from being damaged or destroyed upon the occurrence of power surges, devices known as transient voltage surge suppressors (TVSSs) are commonly employed. TVSS devices are typically connected in parallel with a device or circuit to be protected. Upon the occurrence of a power surge, these surge suppressing devices clamp the voltage impressed across their terminals to a predetermined value. Metal Oxide Varistors (MOVs) or gas discharge tubes are typically utilized as surge suppressor components and exhibit voltage clamping properties.

The effectiveness of a TVSS device in clamping transient surges is measured at the device outer terminals. The voltage clamping level of the surge suppressing components, such as MOVs, is degraded by the wiring between the components and the device terminals. In other words, the protected equipment "sees" less protection at the circuit terminals than the TVSS components are capable of providing. This reduction in surge suppression protection at the terminals of a TVSS device is caused by the inductance in the wires or cables connecting TVSS components to the device (referred to herein as a surge suppressor) external terminals. A TVSS circuit includes a finite length of wire or cable to connect the circuit board terminals to the surge suppressing device external terminals. Wire or cable is typically used which exhibits a relatively high value of inductance, even for low gauge wire or bus bar. During high current surges (i.e., from transient overvoltages), a significant voltage develops across the cable due to its inherent inductance. At the circuit, voltage is clamped at the TVSS rated clamping voltage plus the voltage developed due to the inductance in the cable, greatly diminishing the effective surge clamping ability (i.e., voltage) at the external terminals of the surge suppressing device.

The instantaneous voltage V across an inductor having inductance L is given by the well known relationship, V=L*di/dt, where di/dt is the instantaneous change in current divided by the instantaneous change in time. Thus, for short duration, high current surge pulses, even the relatively small inductance of standard #12 or #14 gauge wire or bus bar causes a large voltage to be generated. For example, a terminal board might include 12 inches of #12 gauge cable having an inductance of 0.3 μH/ft for connecting the board's terminals to the TVSS device thereon. The inductance of both the input and return wire would therefore be 0.6 μH. A surge current pulse having a duration of 8 μs and a magnitude of 3000 amperes would generate a voltage of 225 V in the cable due to the inductance. Thus, a TVSS circuit incorporating an internal surge suppressor device circuit rated at its pins at 400 V could only provide protection of 625 volts at its circuit terminals, i.e., 625 volt clamping protection instead of 400.

Conventional attempts to provide a solution to this problem typically focus on increasing the current handling capability of the electrical connection between the suppressor external terminal contacts and the surge suppressor components. For example, low impedance heavy gauge copper bus bars are used instead of wire or cable. Although the resistivity of the connection is reduced, the inductance is only slightly affected. Thus, there is still a large inductive reactance in the bus bars and as a result of any large change in current over time, e.g., a short time, thereby generating an unacceptably large voltage at the external connections. Accordingly, there is a need for improved connections for connecting a TVSS component to external line power such that the voltage generated across this connection (i.e., a connection which preferably displays a minimal inductance) during a power surge is minimal.

OBJECTS AND SUMMARY OF THE INVENTION

It is therefore an object of the present invention to overcome the above-mentioned shortcomings of the prior art.

It is another object of the present invention to provide a method and apparatus for suppressing power surges which minimize a voltage generated in a conductive path connecting the TVSS device to a source of power thereby maximizing TVSS protection for equipment connected at the power source.

It is another object of the present invention to provide a method and apparatus for suppressing power surges which include means for providing a conductive path which displays a minimum inductance such that a voltage induced across the inductance during a transient power surge is a minimum.

It is still another object of the present invention to provide a method and apparatus for suppressing power surges which utilize stripline circuitry to provide a conductive path between a source of power and a TVSS device such that a minimum inductive reactance is generated in the stripline during a transient power surge.

Apparatus of the present invention utilizes stripline techniques for suppressing transient voltage surges normally induced in conductive paths connecting a power source to a TVSS device. More particularly, the inductance and capacitance characteristics of the electrical conductive path connecting the surge suppressor components to the external line power are improved by the stripline means implemented according hereto. While typically associated with high frequency, low power applications such as UHF, VHF, microwave and millimeter wave circuits, stripline techniques provide for controlling the characteristic impedance, in particular, the inductance, of the conductive path formed thereby. One advantage of using stripline circuitry to connect a TVSS to a circuit for protection is that it eliminates the need to place the surge suppressor (TVSS) very close to the terminals of the circuit board upon which it resides, a typical if not overly effective effort found in the prior art for attempting to reduce the magnitude of voltages (directly related to length) generated in the connecting cable. Thus, flexibility is increased as to the mechanical layout of the TVSS device relative to the protected circuitry. This is a big advantage over conventional bus bars and ordinary copper wiring which restrict board layout because of their inherent inductance and are faced with unacceptable induction-induced voltages present in the wires during over-voltage surging.

In one embodiment, a transient voltage surge suppressor circuit or system is provided which includes an input terminal coupled using a stripline conductor from a source of electrical power to a surge suppressor component for clamping the source line voltage to a predetermined value. The electrical stripline conductor acts to minimize the inductance and thus the characteristic impedance of the electrical connection between the input terminal and the surge suppressor device. The result is an increased clamping voltage effectiveness at the input terminal to the suppressor circuit.

DETAILED DESCRIPTION OF THE INVENTION

Figure 1:
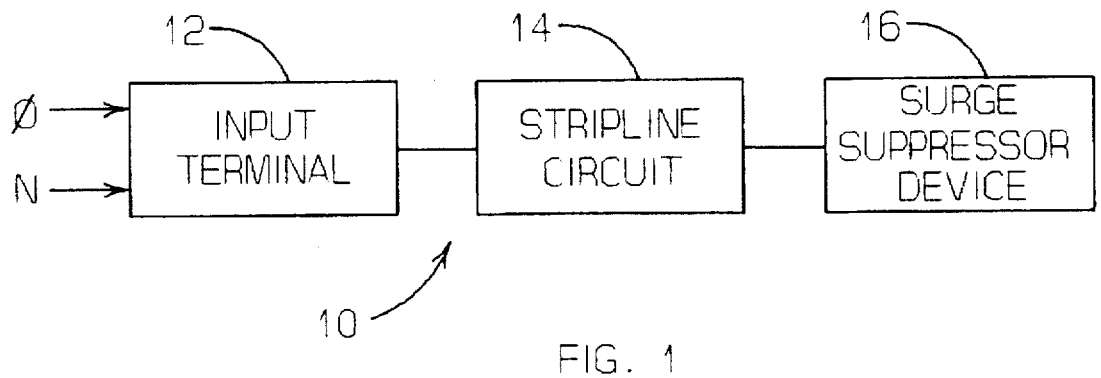
FIG. 1 is a functional block diagram of a preferred embodiment of the present invention.
Figure 2:
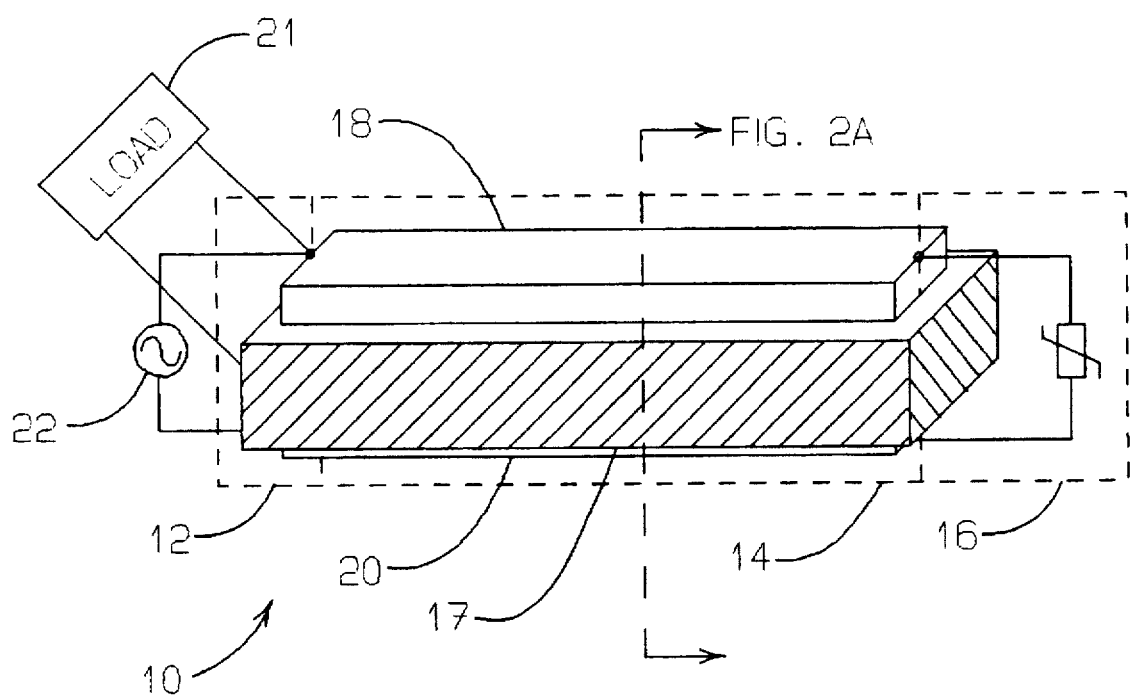
FIG. 2 is a schematic diagram of the preferred embodiment of the present invention of FIG. 1.
Figure 2A:
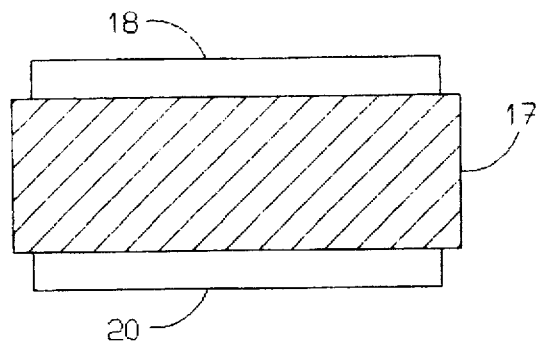
FIG. 2A is a schematic diagram of the cross sectional view of the embodiment depicted in FIG. 2.
Figure 2B:
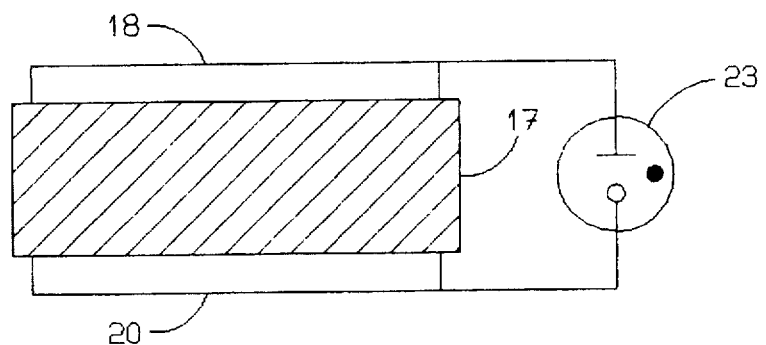
FIG. 2B is a schematic diagram showing the connection of a gas discharge device across the stripline in place of the MOV shown in FIG. 2

A transient voltage surge suppressor circuit 10 (hereinafter referred to interchangeably as suppressor or TVSS circuit) of the present invention is shown in FIG. 1. Phase and neutral terminals of an external electrical power source (not shown in the figure) are connectable as shown to an input terminal 12 of the suppressor circuit 10. A conventional surge suppressor device 16 functions to clamp the line voltage to a predetermined voltage value upon the occurrence of a power surge and is coupled to the input terminal via stripline circuit 14. Surge suppressor device 16 may employ, for example, solid state surge suppressors, such as MOVS, as shown in FIG. 2, gas discharge tubes 23, as shown in FIG. 2B, etc. Stripline circuit 14 is utilized herein to electrically connect the surge suppressor device 16 to input terminal 12. The stripline circuit controls the characteristic impedance ($Z_O$), i.e., the combined inductance, capacitance and resistance, of the conductive path. Although stripline techniques are traditionally associated with high frequency, low power applications, such as RF and radar, the present invention has applied stripline techniques to low frequency, high power applications, e.g., 120 V, 60 Hz single and multiple phase AC power TVSS devices.

A more detailed view of the structure of surge suppressor circuit 10 is shown in FIG. 2. An electrical power source 22 is shown therein, identifying both phase and neutral lines which are connected to circuit input terminal 12 and a load (i.e., a circuit requiring overvoltage protection) 21. Also connected to terminal 12 is a length of the stripline, i.e., a stripline circuit 14, coupling power from power source 22 to the TVSS device 16. Stripline circuit 14 consists of two parallel stripline conductors 18, 20 located very close to one another and separated by a dielectric 17 to realize high magnetic flux cancellation and extremely low inductance. A preferred gap between the two stripline conductors 18, 20 is around 4 mils since standard 4 mil mylar facilitates low impedance and 5000 volt dielectric capability. The length of striplines 18, 20 are preferably kept as short as possible to reduce its inductance (i.e., impedance) and are approximately 6 inches in length. Surge suppressor device 16 is electrically coupled to stripline circuit 14 at the other ends of stripline conductors 18, 20.

A cross-sectional view of a portion of stripline circuit 14 of FIG. 2 will now be described with reference to FIG. 2A. The electrical characteristic (the circuit's characteristic impedance) is determined by the dimensions of stripline conductors 18, 20, the properties of the conductive material, and the properties of the insulating film or printed circuit board or dielectric 17 upon which the stripline conductors are mounted. The distance between stripline circuits 18, 20 and their respective thickness and widths determine, to a large extent, the flux canceling capability and inherent inductance of stripline circuit 14. For example, ⅝" wide strips, 0.011" thickness, 12" long and separated by 4 mil thick mylar.

To achieve the high current carrying capability required of an industrial or commercial grade TVSS device (e.g., the ability to handle 3000 ampere surges), the width of striplines 18, 20 is relatively wide. For example the stripline described above only added 7 volts clamping for a 12" length and 3000 amp, 8×20 transient pulse. Much lower inductance values for the connection (i.e., corresponding to lower voltages induced within the stripline circuit 14) were achieved by widening the stripline conductors 18, 20 rather than by increasing their thickness. Increasing the thickness of a bus bar does not achieve as large a flux cancellation and subsequent lower inductance values as does widening a thin stripline conductor.

Figure 3:
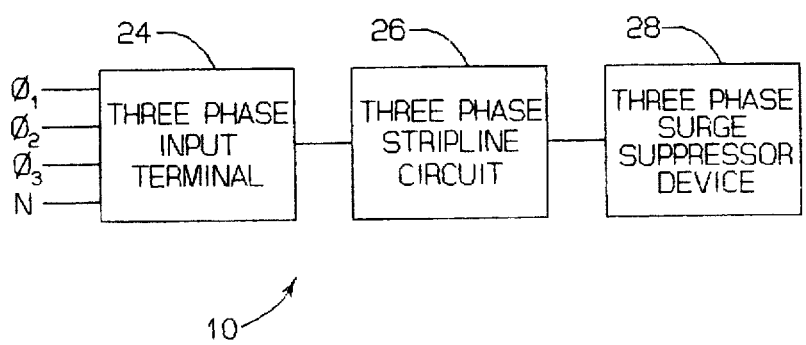
FIG. 3 is a functional block diagram of another embodiment of the present invention which provides for protection in a three phase electrical power circuit.

While TVSS device 10 of FIG. 1 is shown connected to a source of single phase electrical power, the invention is also useful in three phase applications, as exemplified by the illustration of FIG. 3. Shown therein are each of three phase, neutral and ground ports for connecting three phase input terminal 24 to the three-phase source (not shown). Three-phase input terminal 24 feeds the potential found at each of three ports to a three phase stripline circuit 26, which electrically couples the potential thereby to three-phase surge suppressor device 28. Three-phase surge suppressor device 28 may be implemented by any conventional surge suppressor technology known to those skilled in the art for clamping energy during power surges. Each incoming electrical phase is associated with an individual stripline conductor 18, 20, 32. The distance between the phase and neutral, phase and ground, or phase to phase stripline conductors, their thickness and width are all optimized to minimize the resultant inductance of each stripline conductor, and therefore the impedance seen by the surge currents.

During development of the present invention, several laboratory tests were performed using different stripline conductor configurations of electrically conductive material and each configuration's various associated dimensions. The test circuit used was similar to the circuit shown in FIG. 2. Electrical power source 22 was replaced with a surge generator for generating standard underwriter lab category B unipolar pulses. Category B unipolar test pulses include 3000 A, 8×20 surge pulses and 6000 V, 1.2×50 pulses. The current pulses, applied to shorted suppressor device terminals rise to a magnitude of 3000 A in 8 μs and decay to half their value in 20 μs. The resultant voltage pulses, when applied to open terminals, rise to a magnitude of 6000 V in 1.2 μs and decay to half their value in 50 μs. The length of electrical conductor (i.e. stripline, wire or bus bar) used for all laboratory tests was 12 inches. For each surge suppressor device connection configuration, the suppression voltages detected at surge suppressor device 16 and at the surge suppressor circuit input terminal 12 were measured. The difference between the two detected voltages is listed in the table below.

| WIRING CONFIGURATION | VOLTAGE DIFFERENCE |
| --- | --- |
| Random #14 gauge wires | 214 V |
| #14 gauge wires 1 inch apart in parallel | 165 V |
| Bus Bars 3 inches apart | 147 V |
| Double sided G10 PC board material, 1/16 inch thick, 1/2 inch wide strips, 2 oz. copper | 44 V |
| Copper bars, 0.061 inches thick, 0.484 inches wide, 4 mil mylar dielectric | 13 V |
| Copper tape, 0.010 inches thick, 0.594 inches wide, 13 mil mylar dielectric | 14 V |
| Copper tape, 0.011 inches thick, 0.625 inches wide, 4 mil mylar dielectric | 7 V |

The results shown above reveal a dramatic decrease in the voltage generated across the connecting conductor by switching from random gauge wires to stripline conductors. It is apparent from the results that the stripline technique is more effective than copper bus bars in reducing clamping voltage loss. The results also dramatize the very limited results achieved by decreasing resistivity (switching from #14 gauge wires to bus bars three inches apart) rather than decreasing conductor inductance.

The description of the present invention, as described herein, was for illustrative purposes only and is not meant to limit the scope or spirit of the invention thereto.

What is claimed is:

1. A transient voltage surge suppressor circuit, for low frequency, high power applications, comprising:
   a) a pair of input terminals for connecting said circuit to a source of electrical power operating at power distribution frequencies and capable of producing transient high current, high power surges and to a circuit requiring low frequency, high power surge suppression protection;
   b) surge suppressor means capable of suppressing low frequency, high power surges, electrically coupled to said input terminals for maintaining maximum voltage suppression capability at said input terminals; and
   c) at least one stripline conductor pair, capable of conducting low frequency, high power electric surges, electrically interposed between said input terminals and said surge suppressor means such that an inductive reactance present within said stripline conductor pair during low frequency, high power surges is minimized.

2. The device defined by claim 1, wherein said at least one stripline conductor pair comprises as one conductor a copper bar and as a second conductor a length of copper tape, separated by a dielectric.

3. The device defined by claim 1, wherein said surge suppressor means comprises at least one solid state surge suppressor device.

4. The device defined by claim 1, wherein said surge suppressor means comprises at least one gas discharge device.

5. The device defined by claim 3, wherein said solid state surge suppressor device comprises at least one metal oxide varistor.

6. A transient voltage surge suppressor circuit, for low frequency high power applications, comprising:
   a) a three phase input terminal for electrical connection to a first, second and third phase port of a three phase electrical power distribution network operating at power distribution frequencies and capable of producing transient high current, high power surges and to an electrical load requiring low frequency, high power surge suppression protection;
   b) three phase surge suppressor means capable of suppressing low frequency, high power surges, electrically coupled to said three phase input terminal for maintaining maximum surge suppression at each of said first, second and third phase port; and
   c) a three phase electrical stripline circuit, capable of conducting low frequency, high power electric surges, interposed between said three phase surge suppressor means and said three phase input terminal for maintaining minimal inductance between said three phase input terminal and said surge suppressor means.

7. The circuit defined by claim 6, wherein said electrical stripline circuit comprises at least one conductor pair one conductor of said pair being a copper bar and the other conductor a length of copper tape.

8. The circuit defined by claim 6, wherein said surge suppressor means comprises at least one solid state surge suppressor device.

9. The circuit defined by claim 6, wherein said surge suppressor means comprises at least one gas discharge device.

10. The circuit defined by claim 8, wherein said at least one solid state surge suppressor device comprises at least one metal oxide varistor.

11. The circuit defined by claim 6, wherein said electrical stripline circuit comprises three stripline conductor pairs.

12. The circuit defined by claim 6, wherein said three phase surge suppressor means comprises line to neutral and/or line to ground surge suppression.

13. A method of effectively suppressing electrical power surges generated in a source of electrical power, operating at power distribution frequencies and capable of producing transient high current, high power surges, connected to an electrical load, requiring low frequency, high power surge suppression protection, comprising the steps of:
   a) providing an input terminal for coupling said source to a surge suppressor device, capable of suppressing low frequency, high power surges, whereby said load may be protected from an overvoltage condition; and
   b) electrically coupling said input terminal to said surge suppressor device utilizing electrical stripline techniques such that an inductance inherent in said coupling is minimized, thereby minimizing voltages induced in said stripline during voltage surges, whereby an effective voltage rating characteristic of said device is substantially available at said input terminal.

14. The method defined by claim 13, wherein said source comprises a source of three phase power.

15. The method defined by claim 14, wherein said coupling comprises coupling a three phase input terminal to a three phase surge suppressor device.

16. The method defined by claim 15, wherein said source of three phase power outputs electrical power at first, second and third phases and said three phase surge suppressor device is coupled utilizing a three phase electrical stripline circuit such that a line voltage of each of said first, second and third phases of electrical power are held to an approximate maximum voltage level.

17. A method of suppressing electrical power surges from a source of electrical power, operating at power distribution frequencies and capable of producing transient high current, high power surges, connected across an input load, requiring low frequency, high power surge suppression protection, comprising the steps of:

a) coupling a surge suppressor device, capable of suppressing low frequency high power surges, across one end of a two ended, stripline conductor pair, said stripline conductor pair capable of conducting low frequency, high power surges; and b) coupling said input load and said source of electrical power across a second end of said stripline conductor pair.

18. A method of suppressing electrical power surges from a three phase electrical power distribution network, operating power distribution frequencies and capable of producing transient high current, high power surges, connected to an input load, requiring low frequency, high power surge suppression protection, comprising the steps of:

a) coupling a three phase surge suppressor device, capable of suppressing low frequency, high power surges, to a three phase stripline circuit, capable of conducting low frequency, high power electric surges, said three phase stripline circuit having two ends, said three phase surge suppressor device coupled at one end of said three phase stripline circuit; and b) coupling said input load and said three phase electrical power distribution network to a second end of said three phase stripline circuit.

* * * * *